United States Patent
Hashimoto et al.

(10) Patent No.: US 9,315,607 B2
(45) Date of Patent: Apr. 19, 2016

(54) TWO-PACK TYPE CURABLE RESIN COMPOSITION

(71) Applicant: THREE BOND FINE CHEMICAL CO., LTD., Kanagawa (JP)

(72) Inventors: Shogo Hashimoto, Kanagawa (JP); Masayuki Tanaka, Kanagawa (JP)

(73) Assignee: Three Bond Fine Chemical Co., Ltd., Sagamihara-shi, Kanagawa (JP)

( * ) Notice: Subject to any disclaimer, the term of this patent is extended or adjusted under 35 U.S.C. 154(b) by 0 days.

(21) Appl. No.: 14/362,544

(22) PCT Filed: Nov. 27, 2012

(86) PCT No.: PCT/JP2012/080636
§ 371 (c)(1),
(2) Date: Jun. 3, 2014

(87) PCT Pub. No.: WO2013/084753
PCT Pub. Date: Jun. 13, 2013

(65) Prior Publication Data
US 2014/0371398 A1    Dec. 18, 2014

(30) Foreign Application Priority Data

Dec. 5, 2011    (JP) .................................. 2011-265754

(51) Int. Cl.
| | | |
|---|---|---|
| C08F 220/18 | (2006.01) | |
| C08F 265/06 | (2006.01) | |
| C08F 120/18 | (2006.01) | |
| C08F 4/40 | (2006.01) | |
| C08F 290/04 | (2006.01) | |
| C09J 4/06 | (2006.01) | |
| C09J 133/06 | (2006.01) | |
| C08L 33/04 | (2006.01) | |

(52) U.S. Cl.
CPC ............. *C08F 265/06* (2013.01); *C08F 4/40* (2013.01); *C08F 120/18* (2013.01); *C08F 220/18* (2013.01); *C08F 290/04* (2013.01); *C09J 4/06* (2013.01); *C09J 133/062* (2013.01); *C08L 33/04* (2013.01); *C08L 2312/00* (2013.01)

(58) Field of Classification Search
CPC .... C08F 120/18; C08F 220/18; C08F 265/06; C08F 290/04; C08F 4/40; C09J 133/062; C09J 4/06; C09J 11/06; C09J 133/04; C09J 133/08; C09J 133/10; C08L 2312/00; C08L 33/04; C08L 2203/10
See application file for complete search history.

(56) References Cited

U.S. PATENT DOCUMENTS

| | | | |
|---|---|---|---|
| 2004/0072933 A1* | 4/2004 | Shustack | 524/280 |
| 2008/0300361 A1 | 12/2008 | Jansen et al. | |
| 2010/0084091 A1* | 4/2010 | Levandoski et al. | 156/331.4 |
| 2010/0236716 A1 | 9/2010 | Hisha et al. | |
| 2012/0322928 A1 | 12/2012 | Jansen et al. | |

FOREIGN PATENT DOCUMENTS

| | | |
|---|---|---|
| JP | 01-168777 | 7/1989 |
| JP | 4-046977 | 2/1992 |
| JP | 2003-105157 | 4/2003 |
| JP | 2008-081713 | 4/2008 |
| JP | 2009-510240 | 3/2009 |
| WO | 2009/041248 | 4/2009 |
| WO | WO-2009148182 A1 * | 12/2009 |
| WO | 2011/064360 | 6/2011 |

OTHER PUBLICATIONS

International Preliminary Report on Patentability for PCT/JP2012/080636, dated Jun. 19, 2014, and English Translation thereof.
International Search Report for PCT/JP2012/080636, dated Dec. 25, 2012.

* cited by examiner

*Primary Examiner* — Irina S Zemel
*Assistant Examiner* — Jeffrey Lenihan
(74) *Attorney, Agent, or Firm* — Dickinson Wright PLLC

(57) ABSTRACT

In the present invention, the two-pack type curable resin composition using a compound having one or more (meth) acrylic groups in the molecule enables both of prolongation of a working life and maintenance of physical properties of a cured product. Prior art had a difficulty in controlling a working life continuously; however, the present invention can easily control the working life and therefore makes it possible to be used in various conditions. Provided is a two-pack type curable resin composition, containing components (A) to (E): component (A) being a compound having one or more (meth) acrylic groups in the molecule thereof; component (B) being hydroperoxide; component (C) being at least one type of copper compound and vanadium compound; component (D) being a compound having 2 to 6 thiol groups in the molecule thereof; and component (E) being saccharin.

4 Claims, No Drawings

TWO-PACK TYPE CURABLE RESIN COMPOSITION

TECHNICAL FIELD

The present invention relates to a two-pack type curable resin composition using one or more (meth)acrylic groups in the molecule, which can control a working life after mixing two liquids.

BACKGROUND ART

Conventionally, two-pack type curable resin compositions each using a compound that has one or more (meth)acrylic groups in the molecule as described in Patent Documents 1 and 2 were known and various techniques have been conventionally known. In these techniques, the active effect is to accelerate curability and the active effect is common in two-pack type curable resin compositions other than those described in the patent literatures described below. For the purpose of improving curability, adding an amine compound and a sulfur compound is also a known technique.

CITATION LIST

Patent Literatures

Patent Literature 1: JP-A No. H01-168777
Patent Literature 2: JP-A No. 2003-105157

SUMMARY OF INVENTION

However, a short working life and a difficulty in controlling the working life are raised as defects of two-pack type curable resin compositions. Also, even when a working life can be prolonged, a phenomenon such as reducing physical properties of a cured product thereof is observed.

That is, a two-pack type curable resin composition using a compound that has one or more (meth)acrylic groups in the molecule has difficulty in controlling a working life, and even if the working life could be prolonged, physical properties of a cured product decrease and the two-pack type curable resin composition thus had difficulty in having both prolongation of a working life and maintenance of physical properties of a cured product. Since a reaction is initiated after mixing two liquids, the mixture gradually thickens and the viscosity becomes high until the reaction product finally cannot be applied.

Means for Solving the Problem

As a result that the present inventors intensively studied in order to solve the above described problems, they discovered a method relating to a two-pack type curable resin composition and achieved the completion of the present invention.

The gist of the present invention will be explained in the following. The first embodiment of the present invention is a two-pack type curable resin composition containing components (A) to (E): the component (A) being a compound having one or more (meth)acrylic groups in the molecule thereof; the component (B) being hydroperoxide; the component (C) being a copper compound and/or a vanadium compound; the component (D) being a compound having 2 to 6 thiol groups in the molecule thereof; and the component (E) being saccharin.

The second embodiment of the present invention is the two-pack type curable resin composition descried in the first embodiment, which contains 0.001 to 5.0 parts by mass of the component (D) with respect to 100 parts by mass of the component (A).

The third embodiment of the present invention is the two-pack type curable resin composition described in the first or the second embodiment, which contains a preparation including a part of the component (A) and the component (B) and a preparation including a residual of the component (A) and the components (C) to (E).

The forth embodiment of the present invention is the two-pack type curable resin composition according to any one of the first to the third embodiments, wherein the component (A) contains an oligomer and the oligomer, the oligomer being obtained by introducing a (meth)acrylic group in an end of the main backbone of a copolymer, and the copolymer being obtained by copolymerizing (meth)acrylic monomers.

DESCRIPTION OF EMBODIMENTS

The details of the present invention will be explained in the following. Note that a working life referred in the specification indicates a time capable of applying the two-pack type curable resin composition to an object to be applied.

Conventionally, when a larger amount of a curable component is blended in order to enhance physical properties of a cured product (such as hardness, tensile strength, coefficient of extension, and shear adhesive strength), a working life shortens and an operational time thus becomes short, which therefore has forced an operator to bear the burden. On the other hand, when a working life is tried to be long, there has been a problem about curability, that is, improvement in physical properties of a cured product and prolongation of a working life have been in a relationship of trade-off.

According to the structure of the present invention, both of prolongation of a working life and maintenance of physical properties of cured product can be possible in a two-pack type curable resin composition using a compound having one or more (meth)acrylic groups in the molecule.

Meanwhile, controlling a working life continuously has been difficult in prior art, but a working life can be easily controlled in the present invention, which thus makes it possible to use the invention in various conditions.

For the component (A) of a compound having one or more (meth)acrylic groups in the molecule, which can be used in the present invention, a compound having one or more (meth)acrylic groups in the molecule, such as a (meth)acrylic oligomer and a (meth)acrylic (-based) monomer, can be used. A (meth)acrylic group ((meth)acryloyl group (—COCHCH$_2$)) having reactivity is remained in the component (A) and the (meth)acrylic group may be present either of a side chain and/or an end in the molecule. Hereinbelow, (meth)acrylic is used as the generic term of acrylic and methacrylic.

Specific examples of (meth)acrylic oligomer include a so-called urethane-modified (meth)) acrylic oligomer obtained by synthesizing a polyvalent polyol with polyfunctional isocyanate and a compound having a (meth)acrylic group and a hydroxyl group. The polyvalent polyol may have various skeletons, and various polyvalent polyols having an ethylene oxide skeleton, a polyester skeleton, a polyether skeleton, a polybutadiene skeleton and a hydrogenated polybutadiene skeleton can be used. Examples thereof also include epoxy-modified (meth)acrylic oligomers obtained by adding (meth)acrylic acid to a bisphenol A-type epoxy resin, a bisphenol F-type epoxy resin, and a phenol novolak resin.

Furthermore, other specific examples of the (meth)acrylic oligomer may be an oligomer that is made of a skeleton obtained by copolymerizing a compound having a vinyl group and has a (meth)acrylic group. As the compound having a vinyl group, a (meth)acrylic monomer is preferable, and various (meth)acrylic monomers can be used.

The (meth)acrylic monomer is the generic term of monomers having an acrylic group or a methacrylic group. Examples thereof include (meth)acrylic acid, methyl(meth)acrylate, ethyl(meth)acrylate, n-propyl(meth)acrylate, isopropyl(meth)acrylate, n-butyl(meth)acrylate, isobutyl(meth)acrylate, t-butyl(meth)acrylate, n-pentyl(meth)acrylate, n-hexyl(meth)acrylate, cyclohexyl(meth)acrylate, n-heptyl (meth)acrylate, n-octyl(meth)acrylate, 2-ethylhexyl(meth)acrylate, nonyl(meth)acrylate, decyl(meth)acrylate, dodecyl (meth)acrylate, phenyl(meth)acrylate, tolyl(meth)acrylate, benzyl(meth)acrylate, 2-methoxyethyl(meth)acrylate, 3-methoxybutyl(meth)acrylate, 2-hydroxyethyl(meth)acrylate, 2-hydroxypropyl(meth)acrylate, stearyl(meth)acrylate, glycidyl(meth)acrylate, 2-aminoethyl(meth)acrylate, γ-(methacryloyloxypropyl)trimethoxysilane, an ethylene oxide adduct of (meth)acrylic acid, trifluoromethylmethyl (meth)acrylate, 2-trifluoromethylethyl(meth)acrylate, 2-perfluoroethylethyl(meth)acrylate, 2-perfluoroethyl-2-perfluorobutylethyl(meth)acrylate, 2-perfluoroethyl(meth)acrylate, perfluoromethyl(meth)acrylate, diperfluoromethylmethyl (meth)acrylate, 2-perfluoromethyl-2-perfluoroethylmethyl (meth)acrylate, 2-perfluorohexylethyl(meth)acrylate, 2-perfluorodecylethyl(meth)acrylate, and 2-perfluorohexadecylethyl(meth)acrylate, but are not limited thereto. A (meth)acrylic oligomer can be obtained by appropriately selecting the above described (meth)acrylic monomers and polymerizing them. As a (meth)acrylic monomer, a (meth)acrylic monomer having a hydrocarbon group is preferably selected and, in particular, alkyl(meth)acrylates such as methyl(meth)acrylate, ethyl(meth)acrylate, n-propyl (meth)acrylate, isopropyl(meth)acrylate, n-butyl(meth)acrylate, isobutyl(meth)acrylate, t-butyl(meth)acrylate, and n-pentyl(meth)acrylate are preferably selected.

As the (meth)acrylic oligomer, an oligomer having the main backbone made of a polymer of (meth)acrylic monomers and containing 1 or more (preferably 1 to 2) (meth)acrylic groups in the molecule is preferable. In such a compound, a (meth)acrylic) acrylic group having reactivity to the component (B) is remained. A place of a (meth)acrylic group present in an oligomer may exist either of a side chain and/or an end in the molecule, but from the viewpoints of rubber elasticity and flexibility, the (meth)acrylic group preferably exists in an end of the main backbone. That is, in one preferable embodiment of the present invention, the component (A) contains an oligomer and the oligomer is obtained by introducing a (meth)acrylic group into an end of the main backbone of a copolymer that is obtained by copolymerizing (meth)acrylic monomers.

In this embodiment, the number of acrylic groups that are introduced in ends of the polymer (the average number of the end acrylic groups) is preferably from 1.0 to 2.0 in consideration of reactivity to the component (B). The average number of the end acrylic groups can be easily adjusted by appropriately adjusting an adding amount of a compound having a (meth)acrylic group (for example, (meth)acrylate/salt), which is added to a polymer of (meth)acrylic monomers, in manufacturing. In addition, since the (meth)acrylic oligomer is a mixture of oligomers each having 0 to 2 of the number of introducing end acrylic groups, there is a case that the average introduction number of end acrylic groups is not an integer.

Examples of a method of introducing a (meth)acrylic group into a polymer of (meth)acrylic monomers, which is the main backbone, in an oligomer obtained by introducing the (meth)acrylic group into the main backbone that is obtained by polymerizing the (meth)acrylic monomers include (1) a method according to a reaction of a vinyl polymer having a hydroxyl group in an end and a (meth)acrylate compound containing chlorine, bromine, or a hydroxyl group, (2) a method according to a reaction of a vinyl polymer having a halogen group in an end and a (meth)acrylate compound containing an alkali metal ion or a quaternary ammonium ion, and (3) a method according to a reaction in which a diisocyanate compound is reacted with a vinyl polymer having a hydroxyl group in an end and a residual isocyanate group is reacted with a hydroxyl group-containing (meth)acrylate. These methods have been already known and described in JP-A No. S61-133201, JP-A No. H11-80250, JP-A No. 2000-38404, JP-A No. 2001-271055 and JP-A No. 2002-69121.

The weight average molecular weight of the above descried oligomer is preferably from 10,000 to 50,000. When the weight average molecular weight is 10,000 or more, elasticity that a cured product has is easily expressed, and a possibility of generating cracks in the cured product is low also in a heat resistance test. On the other hand, when the weight average molecular weight is 50,000 or less, viscosity is appropriate and a possibility of generating stretching a string when a thermosetting composition is applied is low.

An oligomer that could be used as the component (A) can be obtained by various polymerization methods, and the methods are not particularly limited, and a radical polymerization method is preferable from the viewpoints of practical uses of monomers and easiness of controlling a reaction. Control radical polymerization is preferable among radical polymerizations, living radical polymerization is more preferable, and atomic transfer radical polymerization is particularly preferable.

A (meth)acrylic monomer can be used as the component (A) in the present invention. For the purpose of adjustment of a viscosity of a composition and improvement in operational properties, an oligomer and a monomer may also be mixed, and a monomer can also be used solely. A (meth)acrylic monomer means a low molecular weight-(meth)acrylic compound having one (meth)acrylic group in one molecule and a molecular weight of less than 1000. Preferable acrylic monomers include a (meth)acrylic monomer having a hydroxyl group in the molecule and/or a (meth)acrylic monomer having a saturated alicyclic structure in the molecule. Specific examples of the (meth)acrylic monomer having a hydroxyl group include 2-hydroxyethyl(meth)acrylate, 2-hydroxypropyl(meth)acrylate, 2-hydroxybutyl(meth)acrylate, 2-(meth)acryloyloxyethyl succinic acid, 2-(meth)acryloyloxyethyl hexahydrophthalic acid, and 2-(meth)acryloyloxyethyl-2-hydroxypropyl phthalate. The most preferable examples include 2-hydroxypropyl methacrylate and/or 2-hydroxyethyl methacrylate and are not limited thereto. As a saturated alicyclic structure in a (meth)acrylic monomer having a saturated alicyclic structure, cyclic aliphatic hydrocarbon groups (preferably, saturated cyclic hydrocarbon groups having 3 to 15 carbon atoms) are preferable, and specific examples thereof include cycloalkyl groups such as a cyclopropyl group, a cyclobutyl group, a cyclopentyl group, a cyclohexyl group, a butylhexyl group, a methylcyclohexyl group, a dimethylcyclohexyl group, a cycloheptyl group, a methylcycloheptyl group, a cyclooctyl group, a cyclononyl group and a cyclodecyl group; a hydronaphthyl group, a 1-adamantyl group, a 2-adamantyl group, a norbornyl group, a methylnorbornyl group, an isobornyl group, a dicyclopentenyl group, a dicyclopentanyl group, and a dicyclopentenyl oxyethyl group. Specific examples of a (meth)acrylic monomer having a saturated alicyclic structure include isobornyl(meth)acrylate, dicyclopentanyl(meth)acrylate, cyclohexyl(meth)acrylate, and adamantanyl(meth)acrylate. The most preferable examples include (meth)acrylic monomers having an isobornyl skeleton and/or a dicyclopentanyl skeleton.

A component (B) that can be used in the present invention includes hydroperoxide. Hydroperoxide is an organic peroxide having a structure as described in the formula 1. Specific examples include p-methane hydroperoxide, diisopropylbenzenehydro peroxide, 1,1,3,3-tetramethylbutyl hydroperoxide, cumene hydroperoxide and t-butyl hydroperoxide, but are not limited thereto:

[Chemical Formula 1]

$$R^1\text{—O—O—H} \qquad \text{Formula 1}$$

(wherein $R^1$ represents a chain aliphatic hydrocarbon group, a cyclic aliphatic hydrocarbon group, an aromatic hydrocarbon group, or a derivative group thereof.)

The numbers of carbon atoms in such a chain aliphatic hydrocarbon group, cyclic aliphatic hydrocarbon group, aromatic hydrocarbon group, and derivative groups thereof are not particularly limited, preferably from 1 to 50, more preferably from 1 to 20, and further more preferably from 1 to 12.

Specific examples of the chain aliphatic hydrocarbon group include methyl, ethyl, n-propyl, isopropyl, n-butyl, isobutyl, tert-butyl, n-pentyl, isopentyl, neopentyl, tert-pentyl, 2-methylbutyl, n-hexyl, isohexyl, 3-methylpentyl, ethylbutyl, n-heptyl, 2-methylhexyl, n-octyl, isooctyl, tert-octyl, 2-ethylhexyl, 3-methylheptyl, 1,1,3,3-tetramethylbutyl, n-nonyl, isononyl, 1-methyloctyl, ethylheptyl, n-decyl, 1-methylnonyl, n-undecyl, 1,1-dimethylnonyl, n-dodecyl, n-tetradecyl, n-heptadecyl, and n-octadecyl.

Specific examples of the cyclic aliphatic hydrocarbon group include the groups explained in the section of (meth) acrylic monomers having an alicyclic structure as described above.

Specific examples of the aromatic hydrocarbon group include aryl groups such as phenyl and naphthyl.

Examples of a derivative group of the chain aliphatic hydrocarbon group, cyclic aliphatic hydrocarbon group or aromatic hydrocarbon group include a chain aliphatic hydrocarbon group substituted with a cyclic or aromatic hydrocarbon group: and an aromatic hydrocarbon group substituted with a chain or cyclic aliphatic hydrocarbon group.

Specific examples of the chain aliphatic hydrocarbon group substituted with a cyclic aliphatic hydrocarbon group include cyclopropylethyl, cyclobutylethyl, cyclopentylethyl, cyclohexylmethyl, cyclohexylethyl, cycloheptylmethyl, cyclooctylethyl, 3-methylcyclohexylpropyl, cyclopropenylbutyl, cyclobutenylethyl, cyclopentenylethyl, cyclohexenylmethyl, cycloheptenylmethyl and cyclooctenylethyl.

Specific examples of the chain aliphatic hydrocarbon group substituted with an aromatic hydrocarbon group include benzyl, 1,1-dimethyl-1-phenyl, 1-phenylethyl, 2-phenylethyl, 2-phenylpropyl, 3-phenylpropyl, 4-phenylbutyl and 5-phenylpentyl.

Specific examples of an aromatic hydrocarbon group substituted with a chain or cyclic aliphatic hydrocarbon group include 4-methylphenyl, 3,4-dimethylphenyl, 3,4,5-trimethylphenyl, 2-ethylphenyl, n-butylphenyl, tert-butylphenyl, isopropylphenyl, diisopropylphenyl, hexylphenyl, nonylphenyl, 2-tert-butyl-5-methylphenyl, cyclohexylphenyl and dodecylphenyl.

The component (B) is preferably added in an amount of 0.1 to 5.0 parts by mass with respect to 100 parts by weight of the component (A). When the amount is within such a range, curability is guaranteed, and also, a reaction does not proceed during preservation and preservation stability is favorable.

The component (C) that can be used in the present invention is a copper compound and/or a vanadium compound. Since sufficient reactivity cannot be obtained with other metallic compounds, a copper compound and/or a vanadium compound is the most appropriate. Specific examples of a copper compound include copper chloride, copper acetate, copper naphthenate and copper acetyl acetonate, but are not limited thereto. Specific examples of a vanadium compound include vanadylacetyl acetonate, vanadium stearate, vanadium naphthate and vanadium pentoxide, but are not limited thereto.

The component (C) is preferably added in an amount of 0.001 to 1.0 part by mass, more preferably 0.01 to 0.1 parts by mass with respect to 100 parts by weight of the component (A). When the amount is within such a range, curability is guaranteed, and also, an effect corresponding to an adding amount can be obtained.

The component (D) that can be used in the present invention is a compound having 2 to 6 thiol groups in the molecule thereof. The reason is not clearly found, but addition of the component (D) enables a working life to be prolonged in the present invention. A compound having one thiol group in the molecule is also known, but an ability of prolonging a working life is low and therefore is not appropriate for the present invention. More preferable examples include a derivative of β-mercaptopropionic acid (compound having —OCOCH$_2$CH$_2$SH) or a derivative of thioglycolic acid (compound having —OCOCH$_2$SH). Specific examples of a thiol compound include tris-[(3-mercaptopropionyloxy)-ethyl]-isocyanurate, pentaerythritol tetrakis(3-mercaptopropionate), dipentaerythritol hexakis(3-mercaptopropionate), trimethylolpropanetris (3-mercaptopropionate), trimethylolpropane tristhioglycolate, and pentaerythritol tetrakisthioglycolate, but are not limited thereto. Specific commercial products thereof include TEMPIC, PEMP, DPMP and TMMP manufactured by SAKAI CHEMICAL INDUSTRY CO., LTD. and TMTP, PETP, TMTG and PETG manufactured by YODO KAGAKU CO., LTD., but are not limited thereto.

The component (D) that can be used in the present invention is preferably added in an amount of 0.001 to 5.0 parts by mass, more preferably 0.001 to 2.0 parts by mass with respect to 100 parts by weight of the component (A). When the amount is within such a range, a working life can be made an appropriately long time, and also, curability is guaranteed and physical properties of a cured product are favorable.

The component (E) that can be used in the present invention is saccharin as represented by the formula 2. The component (E) is preferably added in an amount of 0.1 to 5.0 parts by mass, more preferably 0.1 to 2.0 parts by mass with respect to 100 parts by weight of the component (A). When the amount is within such a range, sufficient curability is guaranteed.

[Chemical Formula 2]

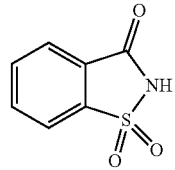

Formula 2

Fumed silica can be added for the purpose of adjusting a viscosity in the present invention. Examples of fumed silica include a type of fumed silica in which silanol is remained in an untreated surface, a type of fumed silica in which a surface is hydrophobicized by adding dimethyldichlorosilane, or the like to the above described silanol, and fumed silica obtained by adding a linear alkyl group having 2 or more carbon atoms, but are not limited thereto.

In addition, an antioxidant may be added according to a purpose, and specific examples thereof include a phenol-based antioxidant, a thio ether-based antioxidant, a phosphorus-based antioxidant, and a nitroxide-based phosphorus, but are not limited thereto.

A photoinitiator may be added in the present invention in order to impart photocurability. Specific examples thereof include acetophenone, propiophenone, benzophenone, xantol, fluorene, benzaldehyde, anthraquinone, triphenylamine, carbazole, 3-methyl acetophenone, 4-methyl acetophenone, 3-pentyl acetophenone, 4-methoxyacetophenone, 3-bromoacetophenone, 2,2-diethoxyacetophenone, p-diacetylbenzene, 3-methoxybenzophenone, 2,4,6-trimethyl benzophenone, oligo(2-hydroxy-2-methyl-1-(4-(1-methylvinyl)phenyl)propanone), 4-allylacetophenone, camphorquinone, 2,4,6-trimethylbenzoyldiphenyl phosphine oxide, 4-methyl benzophenone, 4-chloro-4'-benzyl benzophenone, 2-hydroxy-2-methyl-1-phenyl-1-propanone, 3-chloroxanthone, 3,9-dichloroxanthone, 3-chloro-8-nonylxanthone, benzoyl, benzoylmethyl ether, benzoinbutyl ether, bis(4-dimethylaminophenyl) ketone, benzylmethoxyketal, 2-chlorothioxanthone, o-methyl benzoate, benzyldimethyl ketal, and methylbenzoyl formate, but are not limited thereto.

In addition, other polymerization accelerators may be contained in the present invention. Examples of the other polymerization accelerators include a hydrazine-based compound, an amine compound, and a toluidine derivative.

Examples of the hydrazine-based compound include 1-acetyl-2-phenylhydrazine, 1-acetyl-2(p-tolyl)hydrazine, 1-benzoyl-2-phenylhydrazine, 1-(1',1',1'-trifluoro)acetyl-2-phenylhydrazine, 1,5-diphenyl carbohydrazine, 1-formyl-2-phenylhydrazine, 1-acetyl-2-(p-bromophenyl)hydrazine, 1-acetyl-2-(p-nitrophenyl)hydrazine, 1-acetyl-2-(2'-phenylethylhydrazine), ethyl carbazate, p-nitrophenylhydrazine, and p-trisulfonylhydrazide.

Examples of the amine compound include heterocyclic secondary amine such as 2-ethylhexylamine, 1,2,3,4-tetrahydroquinone and 1,2,3,4-tetrahydroquinaldine; heterocyclic tertiary amine such as quinoline, methylquinoline, quinaldine, and quinoxalinephenazine; aromatic tertiary amine such as N,N-dimethyl para-toluidine, N,N-dimethyl anisidine, and N,N-dimethylaniline; and azole-based compounds such as 1,2,4-triazole, oxazole, oxadiazole, thiadiazole, benzotriazole, hydroxybenzotriazole, benzoxazole, 1,2,3-benzothiadiazole and 3-mercaptobenzotrizole.

Examples of the toluidine derivative include aniline derivatives such as N,N-dimethyl aniline and N,N-diethyl aniline, and toluidine derivatives such as N,N-dimethyl-P-toluidine and N,N-diethyl-P-toluidine.

In order to adjust characteristics to a degree at which a working life of the present invention and physical properties of a cured product are not damaged, various additives such as a radical thermosetting agent, an organic filler, an inorganic filler, an antioxidant, a plasticizer, a physical property adjusting agent, a solvent, and an optical stabilizer may also be blended.

The two-pack type curable resin composition of the present invention is preserved as two preparations and the both preparations are used by mixing before applying a material to be applied. Specifically, the above described components (A) to (E) are main components and these are therefore divided into two packages. Since the component (C), the component (D) and the component (E) are components that promote decomposition of the component (B), the component (B) and the components (C), (D) and (E) are preferably separated. Therefore, in one preferable embodiment of the present invention, the two-pack type curable resin composition is made of a preparation (agent A) containing a part of the component (A) and the component (B) and a preparation (agent B) containing the other part of the component (A) and the components (C) to (E).

The content of the component (A) contained in the agent A and the agent B is not particularly limited, and parts by mass of the component (A) contained in 100 parts by mass of the agent A: parts by mass of the component (A) contained in 100 parts by mass of the agent B is preferably 1:0.8 to 1.2.

The agent A and the agent B are used by mixing the both agents in use. A mixing mass ratio of the agent A and the agent B in use is generally preferably agent A:agent B=1:0.9 to 1.1. In addition a mixing volume ratio of the agent A and the agent B is generally preferably agent A:agent B=1:0.9 to 1.1.

After mixing the agent A and the agent B, a cured product is obtained by curing a composition. The two-pack type curable resin composition of the present invention can be cured even at a normal temperature. Operational efficiency is improved without need of a particular curing device, a composition is preferably cured at a normal temperature, and specifically, curing is preferably carried out at 20 to 40° C. Therefore, one preferable embodiment of the present invention is a normal temperature curable two-pack type resin composition.

The two-pack type curable resin composition of the present invention is suitable for a use for the purposes of adhesion and fixing at the time of fabrication of electronic parts, electrical parts, sensors, motors, and the like of automobiles. In particular, since the present invention is capable of being cured at room temperature, photocuring by an ultraviolet irradiation device or heat curing by a hot air drying furnace may not be performed and the composition is quickly cure and, at the same time, a working life until the composition is cured is guaranteed; therefore, an operational time is shortened so as to intend operational efficiency.

The present invention also includes a cured product obtained by curing the above-described two-pack type curable resin composition.

EXAMPLES

The present invention will be more specifically described below by referring to Examples; however, the present invention is not limited only to these Examples Production Example 1

A compound in which a main backbone is made of a polymer of (meth)acrylic monomers, which has at least two (meth)acrylic groups in the molecule, was produced. N-butyl acrylate was polymerized using copper (I) bromide as a catalyst, pentamethyl diethylenetriamine as a ligand, and diethyl-2,5-dibromoadipate as an initiator, 300 g of this polymer was dissolved in N, N-dimethylacetoamide (300 mL), thereto was added 5.3 g of potassium acrylate, the mixture was stirred at 70° C. for 3 hours under a nitrogen atmosphere to thus obtain a mixture of poly(n-butyl acrylate) having acrylic groups in both ends (hereinafter referred to as the polymer 1). N,N-dimethylacetoamide in this mixture solution was distilled away under reduced pressure, thereafter adding toluene to the residual and an undissolved content was removed by filtration. Toluene in the filtrate was distilled away under reduced pressure to purify the polymer 1. The weight average molecular weight of the polymer 1 after purification was 32308, the dispersibility was 1.36, and the average end acrylic group number was 2.0 (that is, an introduction ratio of acrylic groups into ends was 100%).

The above described "weight average molecular weight" and "dispersibility (ratio of weight average molecular weight and number average molecular weight)" were calculated by a standard polystyrene conversion method using gel permeation chromatography (GPC). In this regard, two columns filled with polystyrene crosslinking gel (Shodex GPC K-802.5; manufactured by Showa Denko K.K.) (Shodex GPCK-804; manufactured by Showa Denko K.K.) as GPC columns were connected in series and chloroform was used as a GPC solvent.

In addition, the average number of the end acrylic group is an average value of the number of acryloyl groups that are introduced into ends per one molecule of a polymer and was calculated from a $^1$H-NMR analysis and the number average molecular weight found by GPC.

Examples 1 to 23 and Comparative Examples 1 to 15

The components described below were prepared in order to prepare two-pack type curable resin compositions. (Hereinafter, a two-pack type curable resin composition is represented as a composition.)
Component (A): compound having one or more (meth) acrylic groups in the molecule thereof
  Polymer 1 (oligomer synthesized in Production Example 1)
  Isobornylacrylate (Light Acrylate IB-XA manufactured by Kyoeisha Chemical Co., Ltd.)
Component (B): hydroperoxide•cumene hydroperoxide (Percumyl H-80 manufactured by NOF CORPORATION) Component (C): copper compound and/or vanadium compound
  Copper naphthenate (Naphthex Copper manufactured by NIHON KAGAKU SANGYO CO., LTD.)
  Cupric chloride hydrate (reagent manufactured by Wako Pure Chemical Industries, Ltd.)
  Vanadylacetyl acetonate (reagent manufactured by Tokyo Chemical Industry Co., Ltd.)
  Vanadium pentoxide (reagent manufactured by Tokyo Chemical Industry Co., Ltd.)
Component (C'): metal compounds other than the component (C)
  Iron naphthenate (Naphthex Iron manufactured by NIHON KAGAKU SANGYO CO., LTD.)
  Phthalocyanine iron (reagent manufactured by Tokyo Chemical Industry Co., Ltd.)
Component (D): compound having a thiol group
  Tris-[(3-mercaptopropionyloxy)-ethyl]-isocyanurate (TEMPIC manufactured by SAKAI CHEMICAL INDUSTRY CO., LTD.)
  Pentaerythritoltetrakis(3-mercaptopropionate) (PEMP manufactured by SAKAI CHEMICAL INDUSTRY CO., LTD.)
  Dipentaerythritolhexakis(3-mercaptopropionate) (DPMP manufactured by SAKAI CHEMICAL INDUSTRY CO., LTD.)
Component (E): saccharin
  Saccharin (regent manufactured by Daiwa Fine Chemicals Co., Ltd.)
Others
  1-acetyl-2-phenylhydrazine (reagent manufactured by Sigma-Aldrich Japan K.K.)
  2-ethylhexylamine (reagent manufactured by JUNSEI CHEMICAL CO., LTD.)
  N,N-dimethyl-p-toluidine (reagent manufactured by Mitsuboshi Chemical Co., Ltd.)
[Method for Preparing Agent A]
  The component (A) and the component (B) were weighed and stirred for 30 minutes. The detailed preparation amounts are followed by Table 1, and numerical values are all represented by parts by mass. (Preparation methods in Tables 3 and 4 are also followed by this method.)
[Method for Preparing Agent B]
  The component (A) was weighed and the component (C), the component (D), the component (E) and the other components were then added thereto and the mixture was stirred for 30 minutes. The detailed preparation amounts are followed by Table 1, and numerical values are all represented by parts by mass. (Preparation methods in Tables 3 and 4 are also followed by this method.)

TABLE 1

| | Components | Raw materials | Comparative Example 1 | Comparative Example 2 | Comparative Example 3 | Comparative Example 4 | Comparative Example 5 | Comparative Example 6 |
|---|---|---|---|---|---|---|---|---|
| Agent A | Component (A) | IB-XA | 20 | 20 | 20 | 20 | 20 | 20 |
| | | Polymer 1 | 30 | 30 | 30 | 30 | 30 | 30 |
| | Component (B) | H-80 | 0.5 | 0.5 | 0.5 | 0.5 | 0.5 | 0.5 |
| Agent B | Component (A) | IB-XA | 20 | 20 | 20 | 20 | 20 | 20 |
| | | Polymer 1 | 30 | 30 | 30 | 30 | 30 | 30 |
| | Component (C) | Naphthex Copper | | | | | | |
| | Component (D) | TEMPIC | 0.5 | 0.5 | | 0.5 | 0.5 | |
| | Component (E) | Saccharin | | | | 0.5 | 0.5 | 0.5 |
| | Others | 1-acetyl-2-phenylhydrazine | | 0.5 | 0.5 | | 0.5 | 0.5 |
| | Total | | 101 | 101.5 | 101 | 101.5 | 102 | 101.5 |

TABLE 1-continued

| Components | | Raw materials | Comparative Example 7 | Comparative Example 8 | Comparative Example 9 | Comparative Example 10 | Example 1 |
|---|---|---|---|---|---|---|---|
| Agent A | Component (A) | IB-XA | 20 | 20 | 20 | 20 | 20 |
| | | Polymer 1 | 30 | 30 | 30 | 30 | 30 |
| | Component (B) | H-80 | 0.5 | 0.5 | 0.5 | 0.5 | 0.5 |
| Agent B | Component (A) | IB-XA | 20 | 20 | 20 | 20 | 20 |
| | | Polymer 1 | 30 | 30 | 30 | 30 | 30 |
| | Component (C) | Naphthex Copper | | 0.025 | 0.025 | 0.025 | 0.025 |
| | Component (D) | TEMPIC | | 0.5 | 0.5 | | 0.5 |
| | Component (E) | Saccharin | 0.5 | | | | 0.5 |
| | Others | 1-acetyl-2-phenylhydrazine | | | 0.5 | 0.5 | |
| | Total | | 101 | 101.025 | 101.525 | 101.025 | 101.525 |

| Components | | Raw materials | Example 2 | Comparative Example 11 | Comparative Example 12 | Example 3 | Comparative Example 13 |
|---|---|---|---|---|---|---|---|
| Agent A | Component (A) | IB-XA | 20 | 20 | 20 | 50 | 50 |
| | | Polymer 1 | 30 | 30 | 30 | | |
| | Component (B) | H-80 | 0.5 | 0.5 | 0.5 | 0.5 | 0.5 |
| Agent B | Component (A) | IB-XA | 20 | 20 | 20 | 50 | 50 |
| | | Polymer 1 | 30 | 30 | 30 | | |
| | Component (C) | Naphthex Copper | 0.025 | 0.025 | 0.025 | 0.025 | 0.025 |
| | Component (D) | TEMPIC | 0.5 | | | 0.5 | |
| | Component (E) | Saccharin | 0.5 | 0.5 | 0.5 | 0.5 | 0.5 |
| | Others | 1-acetyl-2-phenylhydrazine | 0.5 | 0.5 | | | 0.5 |
| | Total | | 102.025 | 101.525 | 101.025 | 101.525 | 101.525 |

[Method of Mixing Agent A and Agent B]

Agent A and agent B were prepared respectively, the agent A and the agent B were then weighed and contained in the same container so as to have a predetermined mixing ratio (agent A:agent B=1:1 (mass ratio)) and the mixture was quickly stirred. (Preparation methods in Tables 3 and 4 are also followed by this method.)

[Confirmation of Status after Mixing Agent A and Agent B]

In terms of Examples 1 to 3 and Comparative Examples 1 to 13, the above described agent A and agent B were mixed, the mixture was then left to stand at 25° C. and the status was confirmed by visual observation after 1 day, 2 days, 3 days and 7 days, and the results were summarized in Table 2.

Herein, "a liquid status" shows a status in which a reaction product has high viscosity but flowability, "partially cured" shows a status in which a cured product is partially formed but a composition is not cured on the whole, and "cured" shows a status in which a composition is cured on the whole. In addition, "-" shows that there is no further confirmation since a composition is already cured. This result founds that Examples 1 and 3 have long working lives and, at the same time, are finally cured. Example 2 corresponds to the present invention, but a degree of a working life is not able to be confirmed since the composition was confirmed after 1 day (after 24 hours).

TABLE 2

| Time left to stand | Comparative Example 1 | Comparative Example 2 | Comparative Example 3 | Comparative Example 4 | Comparative Example 5 | Comparative Example 6 | Comparative Example 7 |
|---|---|---|---|---|---|---|---|
| After 1 day | Liquid | Liquid | Liquid | Liquid | Liquid | Liquid | Liquid |
| After 2 days | Partially cured | Liquid | Liquid | Liquid | Liquid | Liquid | Liquid |
| After 3 days | Partially cured | Liquid | Partially cured | Liquid | Liquid | Liquid | Liquid |
| After 7 days | Partially cured | Liquid | Partially cured | Liquid | Liquid | Liquid | Liquid |

| Time left to stand | Comparative Example 8 | Comparative Example 9 | Comparative Example 10 | Example 1 | Example 2 | Comparative Example 11 | Comparative Example 12 | Example 3 | Comparative Example 13 |
|---|---|---|---|---|---|---|---|---|---|
| After 1 day | Liquid | Liquid | Cured | Liquid | Cured | Cured | Cured | Liquid | Cured |
| After 2 days | Liquid | Liquid | — | Liquid | — | — | — | Liquid | — |
| After 3 days | Partially cured | Liquid | — | Cured | — | — | — | Cured | — |

| | | | After 7 days | Partially cured | Liquid | — | — | — | — | — | — | — |

With respect to the component (A) that is the main agent having a (meth)acrylic group, the component (B) is decomposed to be a generation source of a radical species, and the component (C) is contained in order to promote curing by stimulating decomposition. Combining the components (A) to (C) is accompanied by rapid curability. In Comparative Examples 8 and 9 in which the component (E) is not added to combination of the components (A) to (C), curing is not completed. On the other hand, Comparative Examples 11 to 13 in which the component (D) is not added are rapidly cured. A clear reason is not revealed, but in Examples 1 to 3 in which the component (D) and the component (E) are simultaneously added, both curability and a working life can be guaranteed.

In order to confirm a working life in detail, working lives for Examples 4 to 18 and Comparative Example 11 were confirmed. Detailed preparation amounts are followed by Table 3 and numerical values are represented by parts by mass. Results are shown in combination in Table 3.

[Measurement of Working Life]

A mixing method is followed by the above described "method of mixing agent A and agent B". A measurement of a time with a timer was initiated immediately after mixing the agent A and the agent B and a test piece was prepared with n=1 in order to measure a shear adhesive strength of identical compositions at an interspace of 5 minutes. Test pieces were continued to be prepared for 120 minutes maximum from initiation. Irons (formal names of SPCC, SD) with a width of 25 mm×length of 100 mm×thickness of 2 mm were used as adherents and the adherents having an adhesion area of 25 mm×10 mm were attached each other with the composition to prepare a test piece. Then, the test piece was left to stand at 25° C. for 24 hours. A composition that is not cured even if it is left to stand is represented as "uncured". A strength at the time of the maximum load is referred to as "shear adhesive strength (MPa)" by a universal tester and is used as an index of adhesion force to an adherent. The details thereof are accorded with JIS K 6850: 1999. The "shear adhesive strength" immediately after stirring is set to 100% and a time of continuing to express at 80% or more is referred to as "a working life (unit: minute)". Since a composition is reacted immediately after mixing the agent A and the agent B to be polymerized, a tendency such that the shear adhesive strength gradually decreases along with an elapsed time is shown. A working life is preferably from 10 to 120 minutes in consideration of operational properties.

TABLE 3

| Components | | Raw materials | Comparative Example 11 | Example 4 | Example 5 | Example 6 | Example 7 | Example 8 | Example 9 | Example 10 |
|---|---|---|---|---|---|---|---|---|---|---|
| Agent A | Component (A) | IB-XA | 20 | 20 | 20 | 20 | 20 | 20 | 20 | 20 |
| | | Polymer 1 | 30 | 30 | 30 | 30 | 30 | 30 | 30 | 30 |
| | Component (B) | H-80 | 0.5 | 0.5 | 0.5 | 0.5 | 0.5 | 0.5 | 0.5 | 0.5 |
| Agent B | Component (A) | IB-XA | 20 | 20 | 20 | 20 | 20 | 20 | 20 | 20 |
| | | Polymer 1 | 30 | 30 | 30 | 30 | 30 | 30 | 30 | 30 |
| | Component (C) | Naphthex Copper | 0.025 | 0.025 | 0.025 | 0.025 | 0.025 | 0.025 | 0.025 | 0.025 |
| | Component (D) | TEMPIC | | 0.005 | 0.010 | 0.015 | 0.020 | 0.025 | | |
| | | PEMP | | | | | | | 0.005 | 0.010 |
| | | DPMP | | | | | | | | |
| | Component (E) | Saccharin | 0.5 | 0.5 | 0.5 | 0.5 | 0.5 | 0.5 | 0.5 | 0.5 |
| | Others | 1-acetyl-2-phenylhydrazine | 0.5 | 0.5 | 0.5 | 0.5 | 0.5 | 0.5 | 0.5 | 0.5 |
| | Total | | 101.525 | 101.53 | 101.535 | 101.54 | 101.545 | 101.55 | 101.53 | 101.535 |
| | Working life | | 5 | 10 | 20 | 25 | 35 | 45 | 15 | 30 |

| Components | | Raw materials | Example 11 | Example 12 | Example 13 | Example 14 | Example 15 | Example 16 | Example 17 | Example 18 |
|---|---|---|---|---|---|---|---|---|---|---|
| Agent A | Component (A) | IB-XA | 20 | 20 | 20 | 20 | 20 | 20 | 20 | 20 |
| | | Polymer 1 | 30 | 30 | 30 | 30 | 30 | 30 | 30 | 30 |
| | Component (B) | H-80 | 0.5 | 0.5 | 0.5 | 0.5 | 0.5 | 0.5 | 0.5 | 0.5 |
| Agent B | Component (A) | IB-XA | 20 | 20 | 20 | 20 | 20 | 20 | 20 | 20 |
| | | Polymer 1 | 30 | 30 | 30 | 30 | 30 | 30 | 30 | 30 |
| | Component (C) | Naphthex Copper | 0.025 | 0.025 | 0.025 | 0.025 | 0.025 | 0.025 | 0.025 | 0.025 |
| | Component (D) | TEMPIC | | | | | | | | |
| | | PEMP | 0.015 | 0.020 | 0.025 | | | | | |
| | | DPMP | | | | 0.005 | 0.010 | 0.015 | 0.020 | 0.025 |
| | Component (E) | Saccharin | 0.5 | 0.5 | 0.5 | 0.5 | 0.5 | 0.5 | 0.5 | 0.5 |
| | Others | 1-acetyl-2-phenylhydrazine | 0.5 | 0.5 | 0.5 | 0.5 | 0.5 | 0.5 | 0.5 | 0.5 |
| | Total | | 101.54 | 101.545 | 101.55 | 101.53 | 101.535 | 101.54 | 101.545 | 101.55 |
| | Working life | | 45 | 60 | 70 | 20 | 40 | 60 | 90 | 100 |

A working life was confirmed when a kind and an adding amount of the component (D) were changed. There is a tendency that the working life was prolonged when the number of thiol groups in one molecule is large, and the working life becomes long when the adding amount is large.

Verifications were conducted for Examples 19 to 23 in which compounds described in Table 4 were used as the component (C) in place of Naphthex Copper of the component (C) in Examples 1 to 18 and Comparative Examples 14 and 15 in which the components (C') were used in place of the component (C). A measurement of a working life is the same as the measurement described above. Detailed preparation amounts are followed by Table 4 and numerical values are all represented by parts by mass. In terms of a working life, the same test as described above was conducted. Results are shown in combination in Table 4.

of 2 mm and left to stand in an anaerobic condition at 25° C. for 24 hours and a sheet-form cured product was prepared. The sheet-form cured product was punched out with a No. 3 dumbbell to thus prepare a test piece. Both ends of the test piece were fixed to a chuck so that the longitudinal axis of the test piece and the center of the chuck are aligned. The test piece was pulled at a tensile speed of 50 mm/min and the maximum load was measured. The strength at the time of the maximum load is assumed to be a "tensile strength (MPa)" and a strength of a cured product itself is digitalized. The details thereof are followed by JIS K 6850: 1999. A cured product preferably has a tensile strength of 2.0 MPa or more.

[Measurement of Coefficient of Extension]

The agent A and the agent B immediately after mixing were flown into a jig designed to have a thickness of a composition of 2 mm and left to stand in an anaerobic condition at 25° C.

TABLE 4

| Components | | Raw materials | Example 19 | Example 20 | Example 21 | Comparative Example 14 | Comparative Example 15 | Example 22 | Example 23 |
|---|---|---|---|---|---|---|---|---|---|
| Agent A | Component (A) | IB-XA | 20 | 20 | 20 | 20 | 20 | 20 | 20 |
| | | Polymer 1 | 30 | 30 | 30 | 30 | 30 | 30 | 30 |
| | Component (B) | H-80 | 0.5 | 0.5 | 0.5 | 0.5 | 0.5 | 0.5 | 0.5 |
| Agent B | Component (A) | IB-XA | 20 | 20 | 20 | 20 | 20 | 20 | 20 |
| | | Polymer 1 | 30 | 30 | 30 | 30 | 30 | 30 | 30 |
| | Component (C) | Naphthex Copper | | | | | | 0.025 | 0.025 |
| | | Cupric chloride hydrate | 0.0075 | | | | | | |
| | | Vanadylacetyl acetonate | | 0.02 | | | | | |
| | | Vanadium pentoxide | | | 0.0075 | | | | |
| | Component (C') | Naphthex Iron | | | | 0.025 | | | |
| | | Phthalocyanine iron | | | | | 0.05 | | |
| | Component (D) | TEMPIC | 0.0025 | 0.0025 | 0.0025 | 0.0025 | 0.0025 | 0.0025 | 0.0025 |
| | Component (E) | Saccharin | 0.5 | 0.5 | 0.5 | 0.5 | 0.5 | 0.5 | 0.5 |
| | Others | 1-acetyl-2-phenylhydrazine | 0.5 | 0.5 | 0.5 | 0.5 | 0.5 | | |
| | | 2-ethylhexylamine | | | | | | 0.5 | |
| | | N,N-dimethyl-p-toluidine | | | | | | | 0.5 |
| | Total | | 101.5 | 101.5 | 101.5 | 101.5 | 101.6 | 101.5 | 101.5 |
| | Working life | | 10 | 10 | 10 | Uncured | Uncured | 15 | 15 |

In case of changing a kind of the component (C), a copper complex or a vanadium complex is suitable. As described in Comparative Example 14 and Comparative Example 15, the compositions were uncured with an iron complex.

A hardness, tensile strength, coefficient of extension and shear adhesive strength were measured as physical properties after complete curing in Examples 4 to 18 and Comparative Example 11. The results thereof were summarized in Table 5.

[Measurement of Hardness (Shore A)]

The agent A and the agent B immediately after mixing were flown into a jig designed to have a thickness of a composition of 6 mm and left to stand in an anaerobic condition at 25° C. for 24 hours and a sheet-form cured product was prepared. While a pressurized surface of an A-type durometer (hardness meter) was kept in parallel to the sheet-form cured product and 10 N force was quickly pressed without accompanying impact and the pressurized surface and the test sample were closely adhered. The maximum value at the measurement was read in the measurement and the maximum value is to be the "hardness (no unit)" and used as an index of softness of the cured product itself. The details thereof are followed by JIS K 6253-3: 2012. A hardness is preferably 40 or more.

[Measurement of Tensile Strength]

The agent A and the agent B immediately after mixing were flown into a jig designed to have a thickness of a composition for 24 hours and a sheet-form cured product was prepared. The sheet-form cured product was punched out with a No. 3 dumbbell to prepare a test piece and marked lines at an interval of 25 mm were prescribed in the test piece. The test piece was fixed to a chuck in the same way as in the measurement of tensile shear strength and pulled until the test piece reached cutting by a tensile speed of 500 mm/min. Since the test piece is stretched and an interval between marked lines is extended in the measurement, the interval between the marked lines is measured with a vernier caliper until the test piece was cut. A ratio of stretching is represented as a "coefficient of extension (%)" based on the initial interval between marked lines and used as an index of flexibility of a cured product itself. A cured product preferably has a coefficient of extension of 100% or more in order to follow expansion and shrinkage.

[Measurement of Shear Adhesive Strength]

A shear adhesive strength in the case that adherents were irons (formal names of SPCC, SD) is assumed to be the shear adhesive strength 1 and a shear adhesive strength in the case that adherents were aluminums (formal names of A1050P) is assumed to be the shear adhesive strength 2. Each adherent with a width of 25 mm×length of 100 mm×thickness of 2 mm was used and a test piece was prepared having an adhesion area of 25 mm×10 mm, and the test piece was left to stand at 25° C. for 24 hours. A strength at the time of the maximum load is referred to as a "shear adhesive strength (MPa)" by a universal tester and is used as an index of adhesion force to an adherent. The details thereof are accorded with JIS K6850: 1999. A cured product preferably has a shear adhesive strength of 5.0 MPa or more.

TABLE 5

| Test items | Comparative Example 11 | Example 4 | Example 5 | Example 6 | Example 7 | Example 8 | Example 9 | Example 10 |
|---|---|---|---|---|---|---|---|---|
| Hardness | 63 | 62 | 59 | 60 | 59 | 63 | 62 | 64 |
| Tensile strength | 5.2 | 6.7 | 6.9 | 6.3 | 6.6 | 5.4 | 6.1 | 6.0 |
| Coefficient of extension | 146 | 146 | 158 | 147 | 150 | 141 | 142 | 142 |
| Shear adhesive strength 1 | 7.2 | 6.8 | 6.8 | 6.8 | 6.6 | 6.6 | 6.9 | 7.1 |
| Shear adhesive strength 2 | 7.5 | 7.6 | 7.4 | 7.4 | 7.2 | 7.1 | 7.2 | 7.2 |

| Test items | Example 11 | Example 12 | Example 13 | Example 14 | Example 15 | Example 16 | Example 17 | Example 18 |
|---|---|---|---|---|---|---|---|---|
| Hardness | 64 | 65 | 63 | 59 | 58 | 63 | 60 | 59 |
| Tensile strength | 6.4 | 6.1 | 5.8 | 6.6 | 6.1 | 6.6 | 6.1 | 5.2 |
| Coefficient of extension | 145 | 151 | 146 | 145 | 153 | 141 | 154 | 141 |
| Shear adhesive strength 1 | 6.8 | 6.8 | 6.3 | 7.1 | 6.6 | 6.4 | 6.4 | 6.2 |
| Shear adhesive strength 2 | 7.2 | 7.2 | 7.2 | 7.6 | 7.4 | 7.4 | 7.4 | 7.2 |

The component (D) is not added in Comparative Example 11 and the example is a composition which cannot guarantee a working life. As comparing between Comparative Example 11 and Examples 4 to 18, there is no difference shown in physical properties; therefore, addition of the component (D) does not give an adverse effect to curability. In particular, when the curability deteriorates, a cured product becomes soft, which easily leads to effects such as reduction in a hardness, decrease in a tensile strength and improvement in a coefficient of extension, but addition of the component (D) also has no effect to these test items. Therefore, the present invention can maintain physical properties and also enables a working life to be prolonged.

INDUSTRIAL APPLICABILITY

Since the present invention is curable at room temperature, heat photocuring by an ultraviolet irradiation device or heat curing by a hot air drying furnace may not be performed, the composition is quickly cured and, at the same time, a working life until the composition is cured is guaranteed; therefore, an operational time is shortened so as to intend operational efficiency. On the other hand, controlling a working life continuously has been difficult in prior art, but the working life can be easily controlled in the present invention, which thus makes it possible to use the invention in various conditions.

The present application is based on Japanese Patent Application No. 2011-265754 which has been filed on Dec. 5, 2011, and the disclosure is incorporated herein by reference in its entirety.

The invention claimed is:

1. A two-pack type curable resin composition, comprising components (A) to (E):
    a first preparation which contains a part of the component (A) and the component (B); and
    a second preparation which contains a residual amount of the component (A) and the components (C) to (E), where the mass ratio of the first preparation and the second preparation is 1:0.9 to 1.1;
    the component (A) being a compound having one or more (meth)acrylic groups in the molecule thereof;
    the component (B) being hydroperoxide;
    the component (C) being at least one type of a copper compound and a vanadium compound;
    the component (D) being a compound having 2 to 6 thiol groups in the molecule thereof, where component (D) is included in an amount of 0.001 to 5.0 parts by mass with respect to 100 parts by mass of component (A); and
    the component (E) being saccharin.

2. The two-pack type curable resin composition according to claim 1,
    wherein the component (A) comprises an oligomer,
    the oligomer being obtained by introducing a (meth)acrylic group in an end of the main backbone of a copolymer, and
    the copolymer being obtained by copolymerizing (meth)acrylic monomers.

3. The two-pack type curable resin composition according to claim 1,
    wherein the component (D) comprises a compound having —OCOCH$_2$CH$_2$SH or a compound having —OCOCH$_2$SH.

4. The two-pack type curable resin composition according to claim 1,
    wherein the component (D) comprises at least one selected from the group consisting of tris-[(3-mercaptopropionyloxy)-ethyl]-isocyanurate, pentaerythritol tetrakis(3-mercaptopropionate), dipentaerythritol hexakis(3-mercaptopropionate), trimethylolpropanetris(3-mercaptopropionate), trimethylolpropane tristhioglycolate, and pentaerythritol tetrakisthioglycolate.

* * * * *